(12) United States Patent
Takahashi et al.

(10) Patent No.: US 7,996,011 B2
(45) Date of Patent: Aug. 9, 2011

(54) COMMUNICATION CONTROL APPARATUS, COMMUNICATION CONTROL METHOD, MOBILE COMMUNICATION TERMINAL, AND DATA RECEPTION METHOD

(75) Inventors: Masaru Takahashi, Yokosuka (JP); Hiroshi Nakamura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 706 days.

(21) Appl. No.: 12/036,838

(22) Filed: Feb. 25, 2008

(65) Prior Publication Data

US 2008/0207266 A1    Aug. 28, 2008

(30) Foreign Application Priority Data

Feb. 27, 2007   (JP) ................................ P2007-047640

(51) Int. Cl.
*H04W 36/00* (2009.01)
(52) U.S. Cl. ......... 455/436; 455/424; 455/439; 370/331
(58) Field of Classification Search .............. 455/424, 455/428, 436–442, 560–561; 370/328, 331–332, 370/395.59, 400
See application file for complete search history.

(56) References Cited

U.S. PATENT DOCUMENTS

| 2006/0014539 A1 | 1/2006 | Oh |
| 2006/0193295 A1 | 8/2006 | White et al. |

FOREIGN PATENT DOCUMENTS

| CN | 1765087 A | 4/2006 |
| EP | 1-549-089 | 6/2005 |
| JP | 2002-359601 | 12/2002 |
| JP | 2004-128579 | 4/2004 |
| JP | 2005-500760 | 1/2005 |
| JP | 2005-311702 | 11/2005 |
| JP | 2005-341310 | 12/2005 |
| JP | 2006-33838 | 2/2006 |
| WO | WO 03/017689 A1 | 2/2003 |
| WO | WO 2005-055524 | 6/2005 |

OTHER PUBLICATIONS

Office Action issued Nov. 23, 2010, in China Patent Application No. 200810082626.6 (with English translation).
European Search Report dated Apr. 6, 2011 in EPC Patent Application No. 08-003469.7, 10 pages.

(Continued)

*Primary Examiner* — Kamran Afshar
(74) *Attorney, Agent, or Firm* — Oblon, Spivak, McClelland, Maier & Neustadt, L.L.P.

(57) ABSTRACT

Data is transmitted through a plurality of types of communication networks to a mobile communication terminal while a handover of the mobile communication terminal is handled. A communication control apparatus 10 is adapted to control data communication to a cell phone 50 connectable to a plurality of types of communication networks, and is composed of a detecting unit 12 for detecting a connection status of the cell phone 50 in each mobile communication network; an assigning unit 13 for assigning data addressed to the cell phone 50, to each mobile communication network to which the cell phone 50 is connected, based on a volume of the data addressed to the cell phone 50 and the detected connection status; a transmitting unit 15 for transmitting the data assigned to each mobile communication network, to the each mobile communication network; and a handover processing unit 14 for performing a handover process in the plurality of types of mobile communication networks, based on the detected connection status.

8 Claims, 15 Drawing Sheets

OTHER PUBLICATIONS

"Load-sharing in wireless multi-homed systems" Haijie Huang et al., Communications, 2005. ICC 2005 IEEE International Conference on Seoul, Korea May 16-20, 2005, Piscataway, NJ, USA, IEEE, vol. 5, DOI: DOI: 10.1109/ICC.2005.1495068, ISBN: 978-0-7803-8938-0, May 16, 2005, p. 3489-p. 3493, XP010825905.

"Investigation of Radio Resource Scheduling in WLANS Coupled With 3G Cellular Network", Luo J et al., IEEE Communications Magazine, IEEE Service Center, Piscataway, US, vol. 41, No. 6, ISSN: 0163-6804, DOI: DOI: 10.1109/MCOM.2003.1204756, Jun. 1, 2003, p. 108-p. 115, XP001163851.

"Performance of hashing-based schemes for Internet load balancing", Zhiruo Cao et al., INFOCOM 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, vol. 1, DOI: DOI:10.1109/1NFCOM.2000.832202, ISBN: 978-0-7803-5880-5, Mar. 26, 2000, p. 332-p. 341, XP010376035.

Japanese Office Action (with English translation) issued on May 31, 2011, in counterpart Japanese Patent Application No. P2007-047640 (5 pages).

*Fig.2*

| TERMINAL ID | | CELL PHONE A | CELL PHONE B | CELL PHONE C | |
|---|---|---|---|---|---|
| AVAILABLE COMMUNICATION SYSTEMS | TDMA | × | ○ | × | ... |
| | CDMA | ○ | ○ | ○ | |
| | HSDPA | ○ | × | × | |
| | WLAN | ○ | × | × | |

Fig.5

| COMMUNICATION SYSTEM | COMMUNICATION RATE |
|---|---|
| TDMA | 9.6kbps |
| CDMA | 384kbps |
| HSDPA | 14.4Mbps |
| WLAN | 11Mbps |

COMMUNICATION CONTROL APPARATUS, COMMUNICATION CONTROL METHOD, MOBILE COMMUNICATION TERMINAL, AND DATA RECEPTION METHOD

BACKGROUND OF THE INVENTION

1. Field of the Invention

The present invention relates to a communication control apparatus, a communication control method, a mobile communication terminal, and a data reception method associated with communication control of data addressed to a mobile communication terminal.

2. Related Background Art

There are conventionally known techniques for transmitting data to a communication terminal through a plurality of types of communication networks. For example, Patent Document 1 below discloses a digital broadcasting system for downloading data through the use of a combination of a satellite circuit and a telephone circuit. This digital broadcasting system is adapted to designate through which circuit each data block forming the data is to be received, via the satellite circuit or via the telephone circuit, and to download the data via the two circuits.

[Patent Document 1] Japanese Patent Application Laid-open No. 2002-359601

SUMMARY OF THE INVENTION

However, the foregoing digital broadcasting system described in Patent Document 1 above is configured without consideration to handovers of the mobile communication terminal (e.g., a handover on the occasion of movement thereof between cells within one communication network, a handover on the occasion of movement thereof from one communication network to a different type of communication network, etc.). For this reason, if this digital broadcasting system is applied to the mobile communication terminal, the mobile communication terminal might suffer a transmission delay, a transmission interruption, etc. on the occasion of transmission of data thereto.

The present invention has been accomplished in order to solve the above problem and an object of the invention is to provide a communication control apparatus, a communication control method, a mobile communication terminal, and a data reception method capable of transmitting data to a mobile communication terminal through a plurality of types of communication networks while handling a handover of the mobile communication terminal.

A communication control apparatus according to the present invention is a communication control apparatus for controlling data communication to a mobile communication terminal connectable to a plurality of types of communication networks, comprising: detecting means for detecting a connection status of the mobile communication terminal in each communication network; assigning means for assigning data addressed to the mobile communication terminal, to each communication network to which the mobile communication terminal is connected, based on a volume of the data addressed to the mobile communication terminal and the connection status detected by the detecting means; transmitting means for transmitting the data assigned to each communication network by the assigning means, to the each communication network; and handover processing means for performing a handover process in the plurality of types of communication networks, based on the connection status detected by the detecting means.

A communication control method according to the present invention is a communication control method for a communication control apparatus to control data communication to a mobile communication terminal connectable to a plurality of types of communication networks, comprising: a detecting step wherein the communication control apparatus detects a connection status of the mobile communication terminal in each communication network; an assigning step wherein the communication control apparatus assigns data addressed to the mobile communication terminal, to each communication network to which the mobile communication terminal is connected, based on a volume of the data addressed to the mobile communication terminal and the connection status detected in the detecting step; a transmitting step wherein the communication control apparatus transmits the data assigned to each communication network in the assigning step, to the each communication network; and a handover processing step wherein the communication control apparatus performs a handover process in the plurality of types of communication networks, based on the connection status detected in the detecting step.

The communication control apparatus and communication control method as described above are configured to detect the connection status of the mobile communication terminal in each communication network, to assign the data to each communication network to which the mobile communication terminal is connected, based on the volume (data size) of the data addressed to the mobile communication terminal and the detected connection status, and to transmit the data to the each communication network. The handover process is carried out based on the connection status of the mobile communication terminal. In this configuration, the data is assigned to each communication network and the handover process is also carried out in accordance with the connection status of the mobile communication terminal. For this reason, the data is transmitted to the mobile communication terminal through a plurality of types of communication networks while the handover of the mobile communication terminal is handled.

The communication control apparatus of the present invention is preferably configured as follows: when the handover process by the handover processing means is finished, the assigning means reassigns the data addressed to the mobile communication terminal.

In this case, the data is reassigned when the handover process is finished, i.e., when a connection environment of the mobile communication terminal after the handover is settled. This configuration reduces the number of reassigning processes of data with a handover and thus reduces the load of the reassigning processes on the communication control apparatus.

The communication control apparatus of the present invention is preferably configured as follows: when the handover process by the handover processing means is initiated, the assigning means reassigns the data addressed to the mobile communication terminal.

In this case, the data is reassigned not only when the handover process is finished, but also when the handover process is initiated. For this reason, the data can be reassigned finer, based on the connection status of the mobile communication terminal.

The communication control apparatus of the present invention is preferably configured as follows: when the handover processing means initiates the handover process for one communication network out of communication networks to which the mobile communication terminal is connected, the assigning means reassigns the data addressed to the mobile communication terminal, to each communication network except for the one communication network.

In this case, when the handover process is initiated for one communication network out of the communication networks to which the mobile communication terminal is connected, the data is assigned to each communication network except for the communication network subjected to the handover. Since the data is reassigned in this manner, the data can be transmitted to only the communication network capable of data communication. For this reason, the efficiency of data transmission is more improved.

The communication control apparatus of the present invention is preferably configured as follows: the assigning means assigns the data addressed to the mobile communication terminal, to each communication network, based on a communication rate of each communication network.

In this case, the data is assigned to each communication network, based on the communication rate of the each communication network to which the mobile communication terminal is connected. Since the communication rate of the communication network affects the efficiency of transmission of data, the data can be transmitted more efficiently to the mobile communication terminal when the data is assigned with consideration to the communication rate.

A mobile communication terminal according to the present invention is a terminal capable of data communication with the foregoing communication control apparatus through connection to a plurality of types of communication networks, comprising: receiving means for receiving data, which was transmitted by the communication control apparatus after the communication control apparatus assigned data addressed to the mobile communication terminal, to each communication network, from the each communication network; and reconfiguring means for reconfiguring the data received by the receiving means, to restore the data addressed to the mobile communication terminal.

A data reception method according to the present invention is a method for a mobile communication terminal to receive data from the communication control apparatus through connection to a plurality of types of communication networks, comprising: a receiving step wherein the mobile communication terminal receives data, which was transmitted by the communication control apparatus after the communication control apparatus assigned data addressed to the mobile communication terminal, to each communication network, from the each communication network; and a reconfiguring step wherein the mobile communication terminal reconfigures the data received in the receiving step, to restore the data addressed to the mobile communication terminal.

With the mobile communication terminal and data reception method as described above, the mobile communication terminal receives the data assigned to each communication network by the communication control apparatus, and the data received is reconfigured to restore the data addressed to the mobile communication terminal. Since the data assigned to each communication network is reconfigured to restore the original form in the mobile communication terminal in this configuration, the user of the mobile communication terminal is allowed to use any desired data.

The communication control apparatus, the communication control method, the mobile communication terminal, and the data reception method as described above permit the data transmission to the mobile communication terminal through a plurality of types of communication networks while handling the handover of the mobile communication terminal.

BRIEF DESCRIPTION OF THE DRAWINGS

FIG. 2 is a drawing showing an example of subscription information stored in a subscription information server shown in FIG. 1.

FIG. 5 is a table showing an example of communication rates in respective communication systems.

DESCRIPTION OF THE PREFERRED EMBODIMENTS

Embodiments of the present invention will be described below in detail with reference to the accompanying drawings. Identical or equivalent elements will be denoted by the same reference symbols in the description of the drawings, without redundant description.

Figure 1:
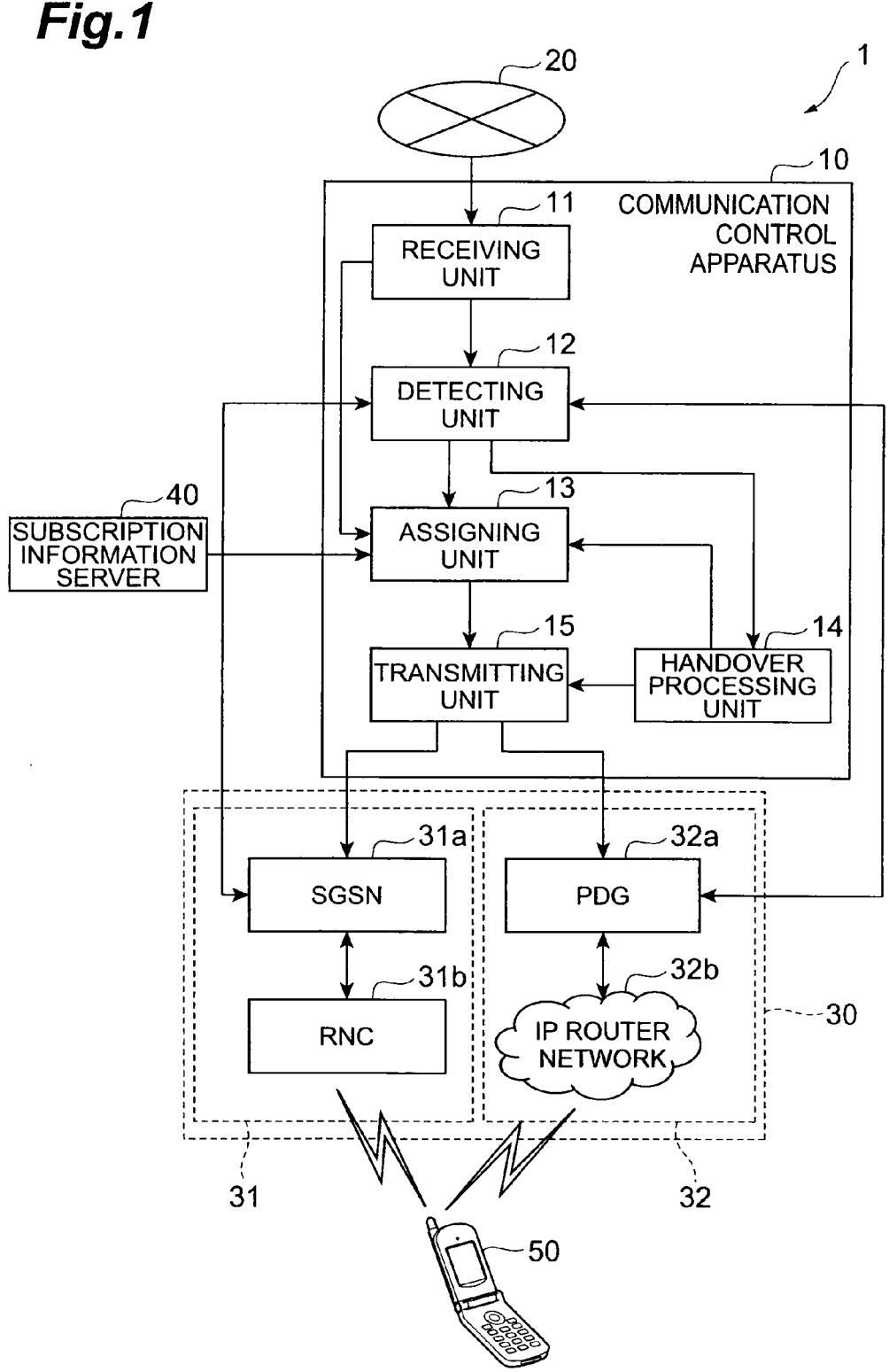
FIG. 1 is a drawing showing a communication system including a communication control apparatus.

First, a communication system 1 including a communication control apparatus 10 according to an embodiment will be described using FIG. 1. FIG. 1 is a drawing showing the communication system 1. The communication system 1 is composed of the communication control apparatus 10, a network 20, a mobile communication network group 30, a subscription information server 40, and a cell phone (mobile communication terminal) 50.

The communication control apparatus 10 controls data communication to the cell phone 50. Specifically, it receives data transmitted from the network 20 and transmits the data to each mobile communication network to which the cell phone 50 is connected (at least one mobile communication network constituting the mobile communication network group 30). Particularly, this communication control apparatus 10 is able to divide one data set into segments and to transmit each of divided data (hereinafter referred to as "data segments") to each mobile communication network. The communication control apparatus 10 is able to acquire subscription information from the subscription information server 40.

The network 20 is composed, for example, of the Internet, a local area network (LAN), a mobile communication network, or the like. There are no restrictions on a specific configuration of the network.

The mobile communication network group 30 includes a plurality of types of mobile communication networks. For example, the mobile communication network group 30 includes mobile communication networks 31 and 32, as shown in FIG. 1. The mobile communication networks included in the mobile communication network group 30 use their respective communication systems different from each other. Examples of the communication systems include FDMA (Frequency Division Multiple Access), TDMA (Time Division Multiple Access), CDMA (Code Division Multiple Access), HSDPA (High Speed Downlink Packet Access), and WLAN (Wireless LAN). It is, however, noted that the communication systems available for the mobile communication networks are not limited to these. There are no restrictions on the number of mobile communication networks included in the mobile communication network group 30, either.

In the present embodiment the mobile communication network 31 includes a Serving GPRS Support Node (SGSN) 31a and a Radio Network Controller (RNC) 31b. On the other hand, the mobile communication network 32 includes a Packet Data Gateway (PDG) 32a and an IP router network 32b. FIG. 1 shows only one each of the components of the mobile communication networks for simplification, but each mobile communication network may include two or more of each of these components. The configuration of each mobile communication network included in the mobile communication network group 30 is not limited to this example.

The subscription information server 40 stores a communication system or communication systems available for each subscriber of a cell phone service, in association with the each subscriber. Specifically, the subscription information server 40 stores subscription information in the form of correspondence of address information to identify a cell phone 50 and communication system(s) available for the cell phone 50. FIG. 2 is a drawing showing an example of the subscription information stored in the subscription information server 40. For example, the communication systems of CDMA, HSDPA, and WLAN are available for the cell phone 50 identified by the address information "cell phone A."

The cell phone 50 is allowed to perform data communication with the mobile communication network group 30. Particularly, this cell phone 50 is able to receive a plurality of data segments through a plurality of mobile communication networks (e.g., mobile communication networks 31 and 32) and to reconfigure these data segments to restore the original data. FIG. 1 shows only one cell phone 50 for simplicity, but the system may include a plurality of cell phones 50 allowed to perform data communication with the mobile communication network group 30.

Figure 3:
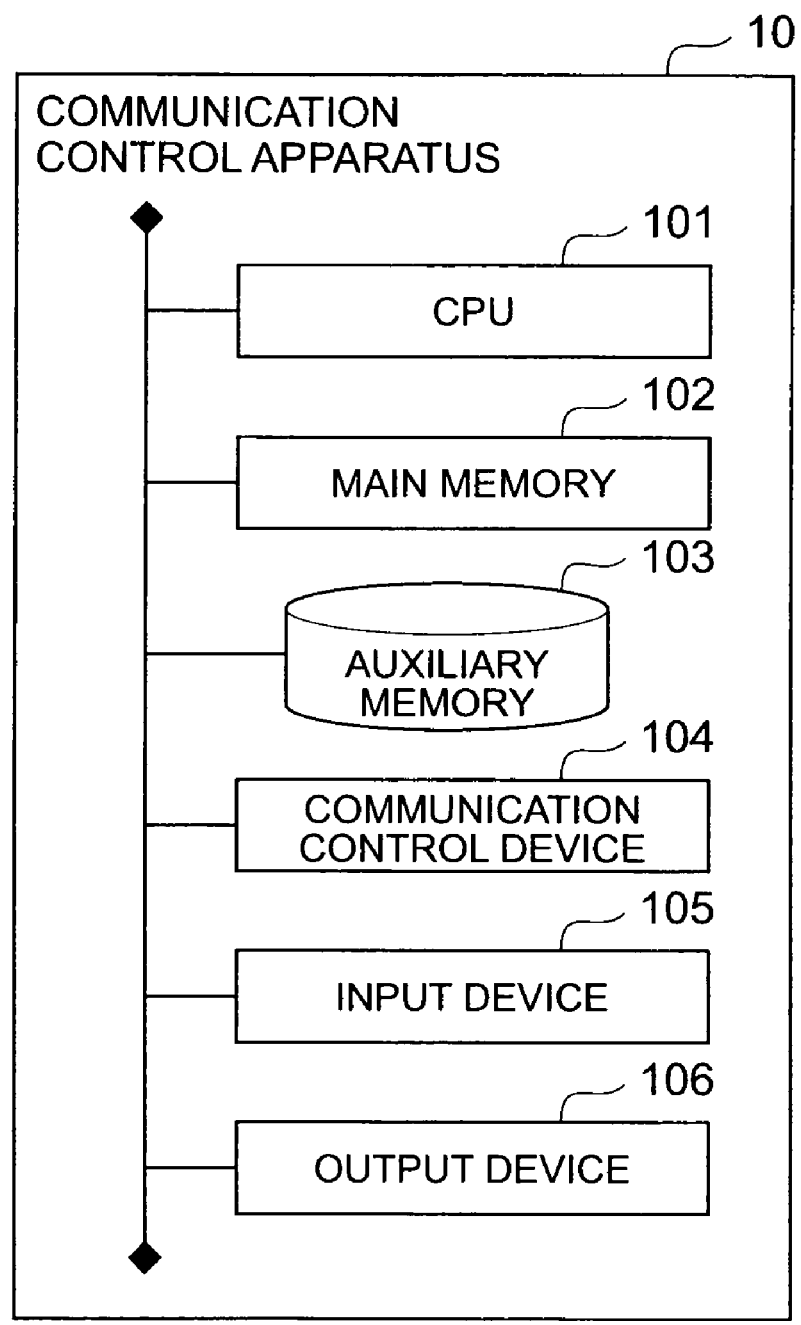
FIG. 3 is a hardware configuration diagram of the communication control apparatus shown in FIG. 1.

The communication control apparatus 10 according to an embodiment will be described below using FIGS. 1 and 3. FIG. 3 is a hardware configuration diagram of the communication control apparatus 10.

The communication control apparatus 10 is provided with the following functional components: receiving unit 11, detecting unit (detecting means) 12, assigning unit (assigning means) 13, handover processing unit (handover processing means) 14, and transmitting unit (transmitting means) 15.

This communication control apparatus 10, as shown in FIG. 3, is composed of a CPU 101 for executing an operating system, application programs, etc., a main memory device 102 consisting of a ROM and a RAM, an auxiliary memory device 103 consisting of a hard disk drive or the like, a communication control device 104 such as a network card, an input device 105 such as a keyboard, and an output device 106 such as a monitor. Each of the functions shown in FIG. 1 is implemented by retrieving predetermined software onto the CPU 101 and the main memory device 102 shown in FIG. 3, letting the communication control device 104 operate under control of the CPU 101, and reading and writing data from and into the main memory device 102 and the auxiliary memory device 103.

The receiving unit 11 is a part that receives data transmitted from the network 20 and outputs the data to the assigning unit 13. This data contains address information of cell phone 50 as a destination. The receiving unit 11 outputs the address information to the detecting unit 12. The communication control apparatus 10 may also be configured to generate data to the cell phone 50 in itself, without receiving the data from the network 20. In this case, the communication control apparatus 10 outputs the generated data to the assigning unit 13 and outputs the address information of the cell phone 50 as a destination to the detecting unit 12.

The detecting unit 12 detects a connection status in each mobile communication network of the cell phone 50 identified by the address information, based on the address information fed from the receiving unit 11, and outputs connection information indicating the detected connection status, to the assigning unit 13 and to the handover processing unit 14. The connection status herein is a connection status of the cell phone 50 to the mobile communication network group 30. For this, the detecting unit 12 acquires information for determining the connection status of the cell phone 50 (which will be referred to hereinafter as "information for detection"), from each of the mobile communication networks 31 and 32. The information for detection is, for example, visitor location information, radio intensity, communication quality, and handover information, but it is not limited to these. The detecting unit 12 detects, for example, a connection status in which the cell phone 50 identified by the address information "cell phone A" became connected to the mobile communication network 31, or a connection status in which the cell phone 50 having been connected to only the mobile communication network 31 also became further connected to the mobile communication network 32.

The detecting unit 12 is a part that detects the connection status, using a type or plural types of information for detection. There are no restrictions on which information for detection the detecting unit 12 uses. A method for the detecting unit 12 to acquire the information for detection is not limited to the above-described one, either. For example, the communication control apparatus 10 may be configured as follows. Each mobile communication network in the mobile communication network group 30 regularly transmits the information for detection to the communication control apparatus 10 and the communication control apparatus 10 stores the information for detection. Then the detecting unit 12 acquires the information for detection stored in the communication control apparatus 10, based on the address information provided, and detects the connection status of the cell phone 50, based on the acquired information for detection.

The detecting unit 12 generates the connection information, based on the connection status of the cell phone 50. This connection information contains address information, and communication system information to identify a mobile communication network and communication system. For example, when the detecting unit 12 detects a connection status in which the cell phone 50 whose address information is "cell phone A" and which has been connected to only the mobile communication network 31 (whose communication system is HSDPA) also became further connected to the mobile communication network 32 (whose communication system is WLAN), the detecting unit 12 generates the connection information containing the address information "cell phone A," and the communication system information "mobile communication network 31 (HSDPA), mobile communication network 32 (WLAN)" and outputs the connection information to the assigning unit 13.

Figure 4:
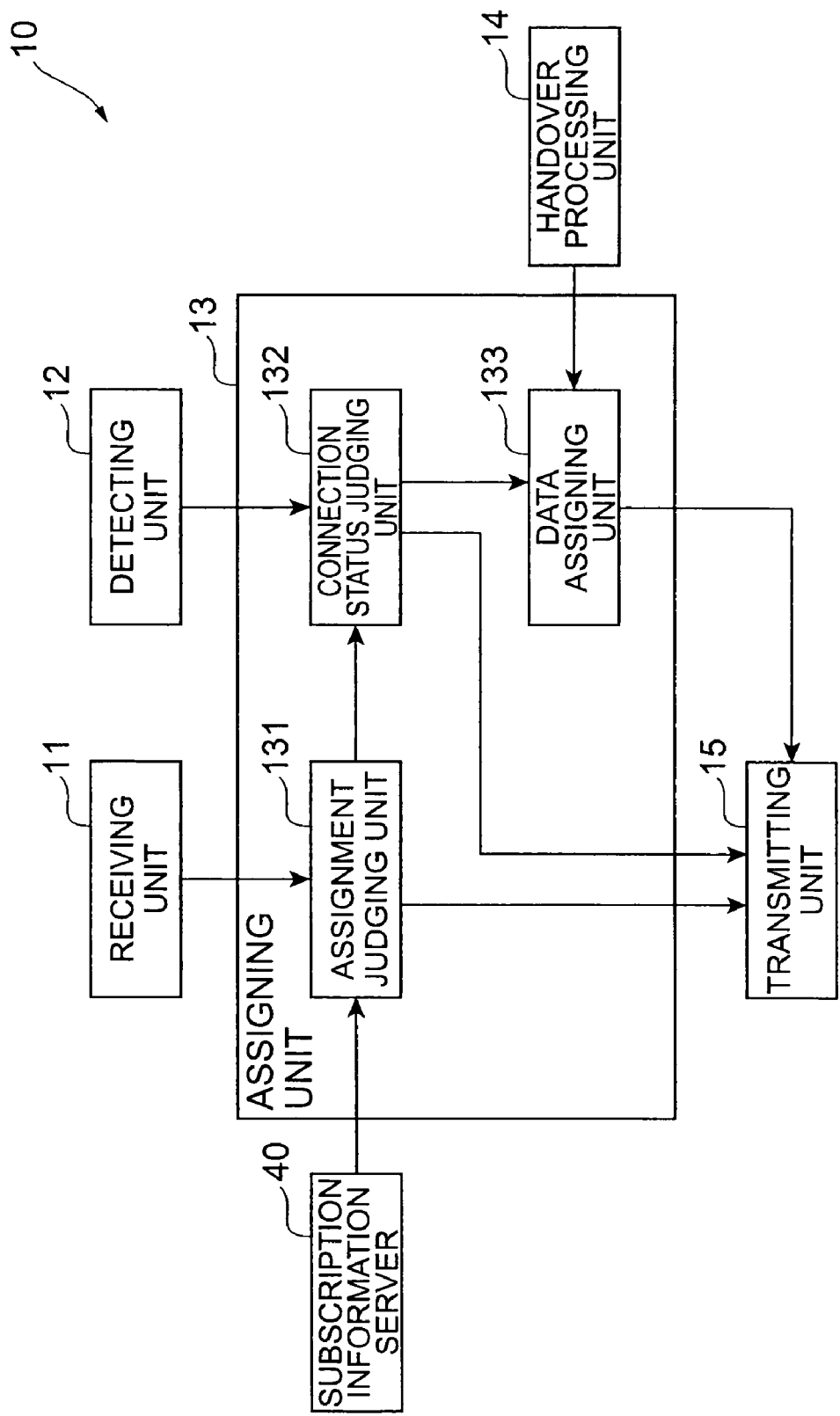
FIG. 4 is a drawing showing a configuration of an assigning unit shown in FIG. 1.

The assigning unit 13 is a part that assigns data addressed to the cell phone 50, to each mobile communication network to which the cell phone 50 is connected, based on the data fed from the receiving unit 11, the connection information fed from the detecting unit 12, handover information fed from the handover processing unit 14, and the subscription information acquired from the subscription information server 40. In other words, the assigning unit 13 divides the data, based on these pieces of information. For this, the assigning unit 13 is composed of an assignment judging unit 131, a connection status judging unit 132, and a data assigning unit 133. The processing carried out in the assigning unit 13 will be described below in detail with reference to FIG. 4. FIG. 4 is a drawing showing a configuration of the assigning unit 13 shown in FIG. 1.

The assignment judging unit 131 is a part that acquires the subscription information from the subscription information server 40 and judges whether the data fed from the receiving unit 11 is to be assigned to each mobile communication network, based on the subscription information. Specifically, when there is only one communication system corresponding to the address information contained in the input data, the assignment judging unit 131 judges that no data assignment is necessary. For example, in a case where the subscription information server 40 stores the subscription information shown in FIG. 2 and where the address information contained in the input data is "cell phone C," the assignment judging unit 131 judges that no assignment of data is necessary. In this case, the assignment judging unit 131 outputs the data to the transmitting unit 15 through a route (a circuit, a communication path, or the like) corresponding to the communication system information (e.g., "CDMA") contained in the acquired subscription information. In contrast to it, where there are a plurality of communication systems corresponding to the address information contained in the input data, the assignment judging unit 131 outputs the input data to the connection status judging unit 132.

The connection status judging unit 132 is a part that judges the connection status of the cell phone 50 identified by the address information contained in the data, based on the data fed from the assignment judging unit 131 and the connection information fed from the detecting unit 12. Specifically, the connection status judging unit 132 judges whether the number of mobile communication networks to which the cell phone 50 is connected is one or more. When the connection status judging unit 132 judges that the cell phone 50 is connected to only one mobile communication network, it outputs the data to the transmitting unit 15 through a route corresponding to the communication system information contained in the connection information. On the other hand, when it judges that the cell phone 50 is connected to a plurality of mobile communication networks, the connection status judging unit 132 outputs the input data and connection information to the data assigning unit 133.

The data assigning unit 133 is a part that assigns data to each mobile communication network, based on the data and connection information fed from the connection status judging unit 132. Specifically, the data assigning unit 133 acquires a volume (data size (in unit of "byte")) of the input data and communication rates of respective communication systems contained in the connection information and determines data sizes to be assigned to the respective mobile communication networks, based on the acquired data size and communication rates. Then the data assigning unit 133 divides the data into segments, based on the determination, and adds identification numbers to the respective data segments. Then the data assigning unit 133 outputs the data segments to the transmitting unit 15 through respective routes corresponding to the communication system information indicating the mobile communication networks to which the segments are assigned.

For implementing data assignment, the data assigning unit 133 preliminarily stores communication rates (bands) of the respective communication systems (in unit of "bps"). FIG. 5 is a table showing an example of the communication rates of the respective communication systems stored. The data assigning unit 133 calculates each of data assignment rates according to Eq (1) below, based on the communication system information contained in the connection information and the communication rates corresponding to the communication system information.

[Math 1]

$$N_n = \frac{a_n}{\sum_i a_i} \quad (1)$$

In the above equation, $N_n$ is a data assignment rate of communication system n, and $a_n$ is a communication rate of communication system n.

For example, in a case where the communication system information contained in the connection information is "mobile communication network 31 (HSDPA), mobile communication network 32 (WLAN)," the data assigning unit 133 performs the calculation according to Eq (1) above to determine that the assignment rate to the mobile communication network 31 is 14.4/(14.4+11)×100=56.7 (%) and the assignment rate to the mobile communication network 32 is 11/(14.4+11)×100=43.3 (%).

Then the data assigning unit 133 assigns the input data to the mobile communication networks 31 and 32, according to the assignment rates thus calculated. Namely, the data assigning unit 133 generates data segments according to the assignment rates. For example, with data of 10 MB (megabytes), the data assigning unit 133 generates a data segment of 5.67 MB containing information of "cell phone A, identification number 1, mobile communication network 31 (HSDPA)," and a data segment of 4.33 MB containing information of "cell phone A, identification number 2, mobile communication network 32 (WLAN)." Namely, the data assigning unit 133 assigns the data, based on the communication rates of the respective mobile communication networks.

In addition to the above, the data assigning unit 133 stores the calculated assignment rates in correspondence to the address information. When there is no change in the connection status of the cell phone 50 on the occasion of transmitting data to the cell phone 50 for which the assignment rates have already been calculated, the data assigning unit 133 performs data assignment using the stored assignment rates. This can eliminate the assignment rate calculating process and thus reduces the load on the data assigning unit 133.

When the handover processing unit 14 performs a handover process for a certain cell phone 50, the data assigning unit 133 recalculates the assignment rates for the cell phone 50, according to the handover information fed from the handover processing unit 14, and updates the stored assignment rates with new assignment rates. Namely, the data assigning unit 133 reassigns the data addressed to the cell phone 50. For example, in a case where the assignment rate to indicate "mobile communication network 31 (HSDPA)=100%" is stored for the address information "cell phone A" and where the cell phone 50 identified by the address information becomes connected to both of the mobile communication networks 31 and 32 by a handover process, the data assigning unit 133 updates the assignment rates of the cell phone 50 to "mobile communication network 31 (HSDPA)=56.7%, mobile communication network 32 (WLAN)=43.3%."

As described hereinbelow, the data assigning unit 133 receives the handover information at both of a handover start and a handover end, and thus the data assigning unit 133 reassigns the data when the handover process is initiated and finished.

Referring back to FIG. 1, the handover processing unit 14 performs the handover process, based on the connection information fed from the detecting unit 12. This is a process for letting the below-described transmitting unit 15 switch between relay devices as destinations (e.g., the serving GPRS support node 31a and packet data gateway 32a, or the like). Specifically, the handover processing unit 14 generates handover information in the form of correspondence of address information, communication system information, and destination information to indicate a relay device of a destination (an IP address or the like), based on the input connection information, and outputs the handover information to the transmitting unit 15. When the handover process is carried out at a certain cell phone 50, the connection status of the cell phone 50 varies at a handover start time and at a handover end time. For this reason, the generation and output of handover information is carried out at both of the handover start time and the handover end time.

The transmitting unit 15 is a part that transmits the data fed through the predetermined route from the assigning unit 13 (including the case of data segments), to the mobile communication network of the destination. Namely, the transmitting unit 15 transmits data assigned to each mobile communication network, to the each mobile communication network. Since a plurality of routes for connection between the assigning unit 13 and the transmitting unit 15 are provided correspondingly to the communication system information (communication system information acquired from either the subscription information or the connection information), the transmitting unit 15 can determine the mobile communication network of the destination, based on the route through which the data was transmitted. For transmission of data, the transmitting unit 15 stores the destination information in correspondence with the address information and the communication system information. Then the transmitting unit 15 extracts the destination information, based on the address information contained in the input data and the communication system information corresponding to the route through which the data was transmitted, and transmits the data to the relay device indicated by the destination information.

The transmitting unit 15 updates the stored destination information, based on the handover information fed from the handover processing unit 14. This changes the relay device of the destination over to another.

Figure 13:
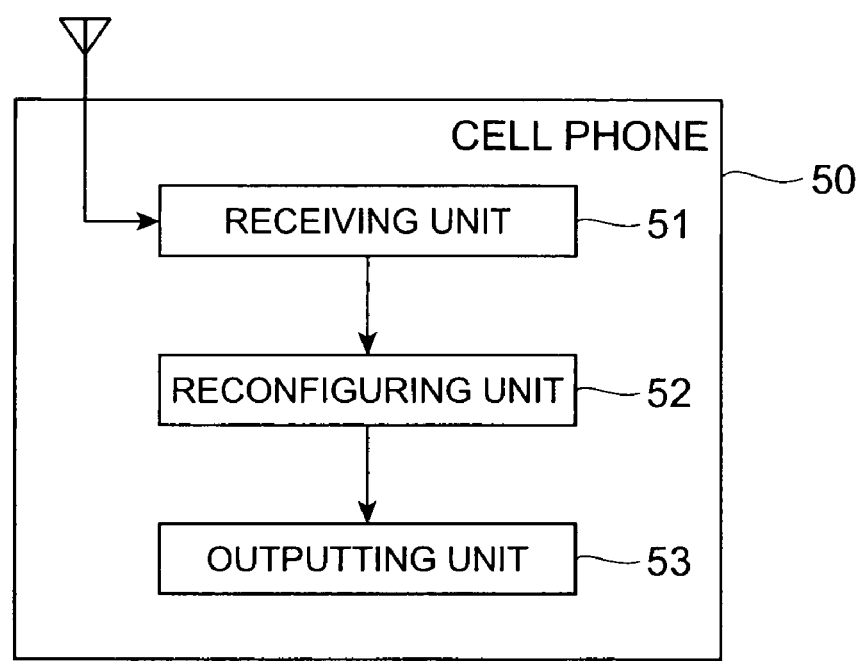
FIG. 13 is a drawing showing a functional configuration of a cell phone shown in FIG. 1.

The cell phone 50 shown in FIG. 1 will be described below with reference to FIGS. 13 and 14. FIG. 13 is a drawing showing a functional configuration of the cell phone 50 and FIG. 14 is a hardware configuration diagram of the cell phone 50.

The cell phone 50 is provided with the following functional components: receiving unit (receiving means) 51, reconfiguring unit (reconfiguring means) 52, and outputting unit 53.

Figure 14:
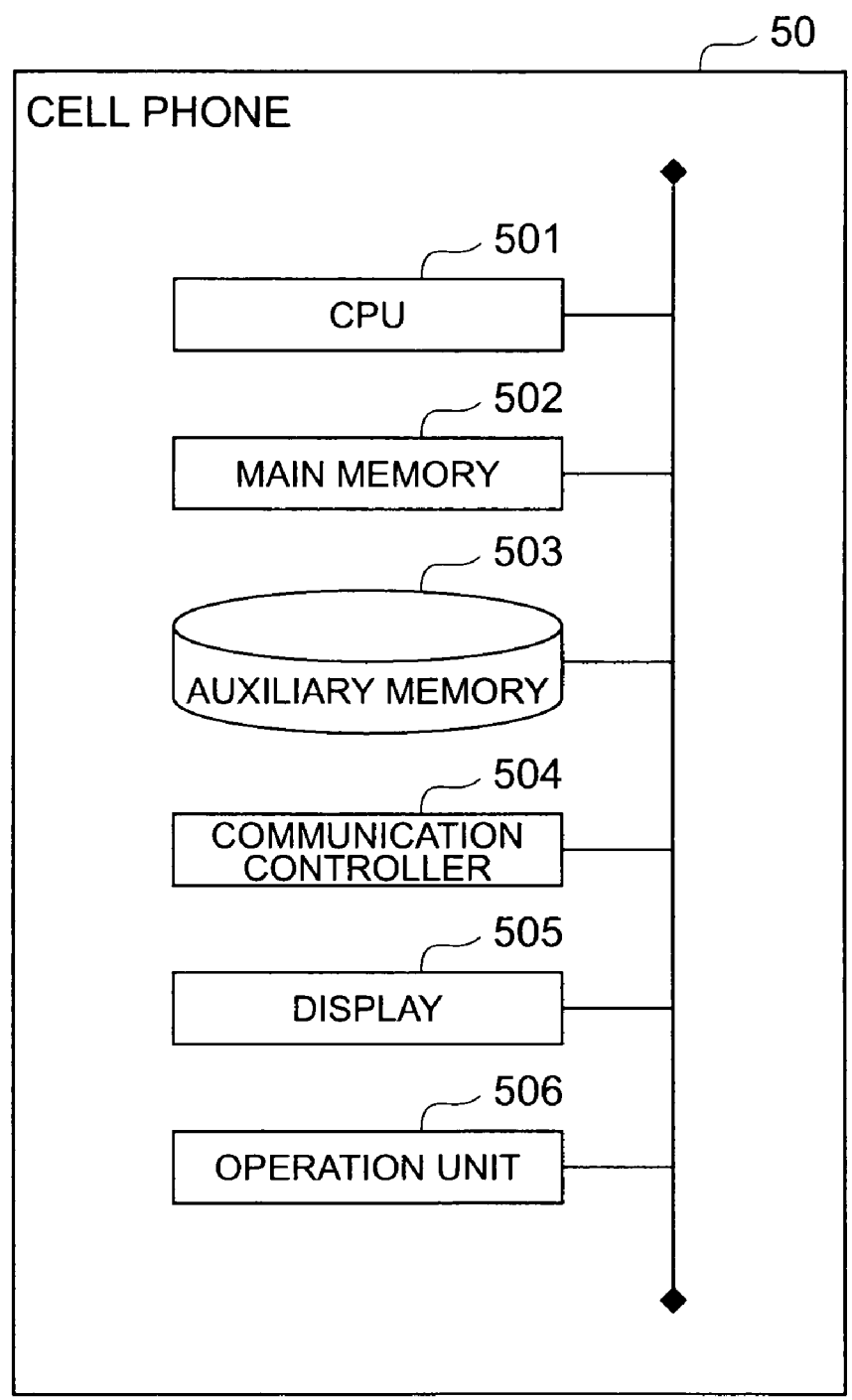
FIG. 14 is a hardware configuration diagram of the cell phone shown in FIG. 1.

This cell phone 50, as shown in FIG. 14, is composed of a CPU 501 for executing an operating system, application programs, etc., a main memory unit 502 consisting of a ROM and a RAM, an auxiliary memory unit 503 consisting of a memory or the like, a communication control unit 504 for performing data communication through the mobile communication network group 30, a display unit 505 consisting of a liquid crystal monitor or the like, and an operation unit 506 consisting of keys for entry of characters and numerals and for instructions of execution. Each of the functions described with FIG. 13 is implemented by retrieving predetermined software onto the CPU 501 and the main memory unit 502 shown in FIG. 14, letting the communication control unit 504 operate under control of the CPU 501, and reading and writing data from and into the main memory unit 502 and the auxiliary memory unit 503.

The receiving unit 51 receives data transmitted from the mobile communication network group 30. Particularly, the receiving unit 51 receives data (data segments) transmitted as assigned to each mobile communication network by the communication control apparatus 10 and outputs the data to the reconfiguring unit 52.

The reconfiguring unit 52 reconfigures the plurality of data segments fed from the receiving unit 51, to restore the original data. Then the reconfiguring unit 52 outputs the reconfigured data (restored data) to the outputting unit 53.

The outputting unit 53 outputs the data fed from the reconfiguring unit 52, to the display unit 505. This permits the user of the cell phone 50 to use the restored data. It should be noted that the processing with the restored data is not limited to this example. For example, another processing unit (not shown) may execute arithmetic processing based on the restored data. In this case, the reconfiguring unit 52 outputs the restored data to the other processing unit.

The processing of the communication control apparatus 10 shown in FIG. 1 will be described below along with a communication control method according to the present embodiment, using FIGS. 6 to 8.

Figure 6:
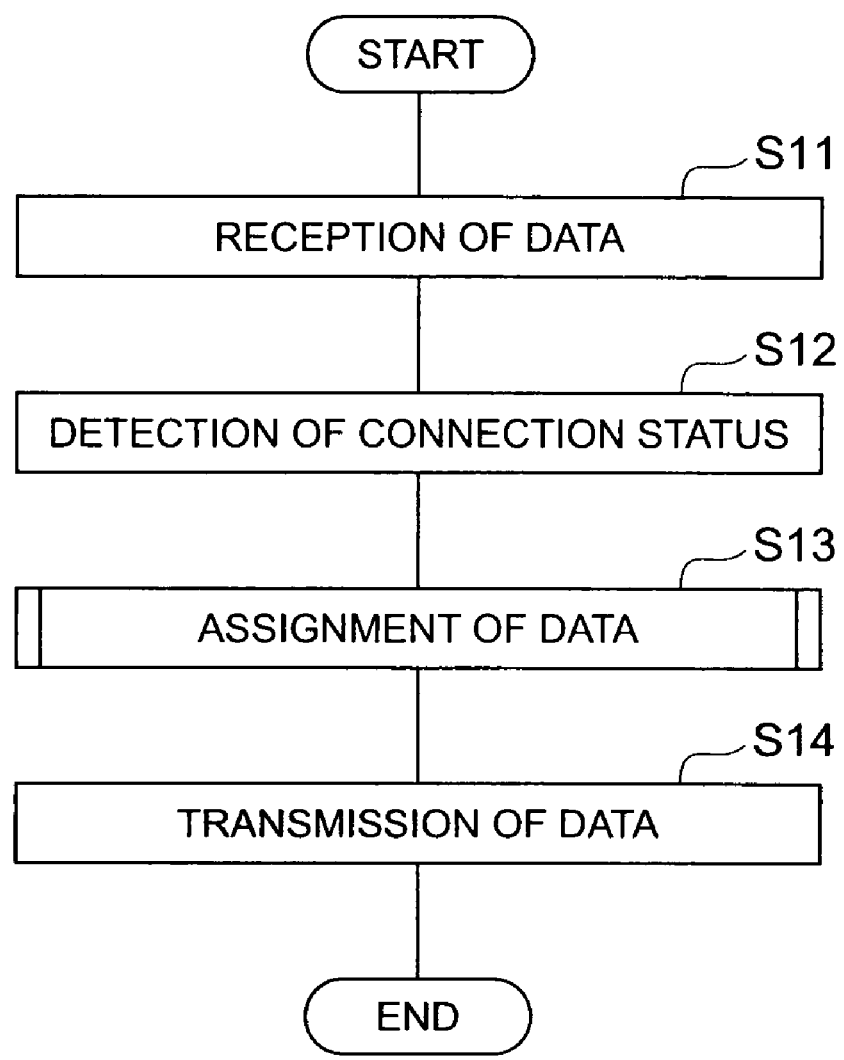
FIG. 6 is a flowchart showing a processing procedure of the communication control apparatus shown in FIG. 1.

FIG. 6 is a flowchart showing the processing of the communication control apparatus 10. In the communication control apparatus 10, the receiving unit 11 first receives data addressed to the cell phone 50 (step S11). The detecting unit 12 detects the connection status of the cell phone 50 (step S12, detecting step). Then, based on the volume of the received data and the detected connection status, the assigning unit 13 assigns the data to each mobile communication network to which the cell phone 50 is connected (step S13, assigning step). Thereafter, the transmitting unit 15 transmits the assigned data (data segments) to each mobile communication network (step S14, transmitting step). Finally, the cell phone 50 receives the data segments and reconfigures the data, based on these data segments.

Figure 7:
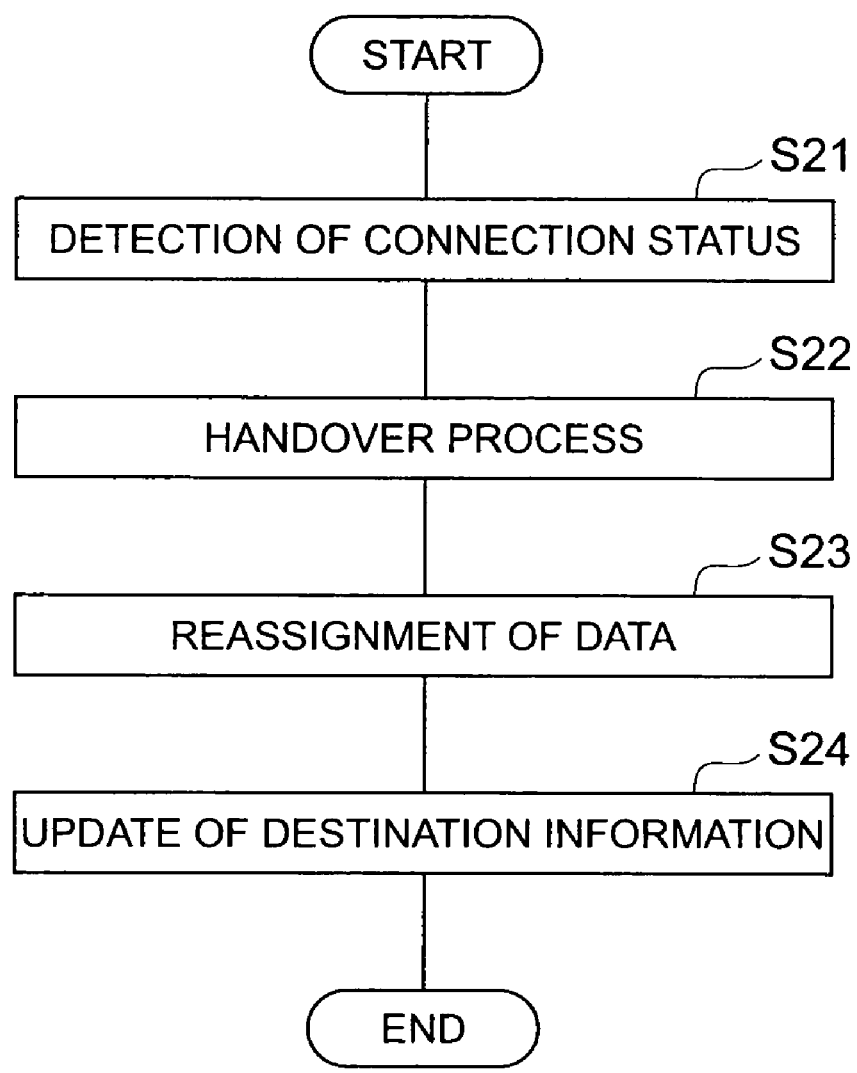
FIG. 7 is a flowchart showing a processing procedure of the communication control apparatus with occurrence of a handover.

FIG. 7 is a flowchart showing the processing of the communication control apparatus 10 on the occasion of occurrence of a handover. In this case, when the detecting unit 12 detects the connection status (step S21, detecting step), the handover processing unit 14 performs the handover process based on the connection status (step S22, handover processing step). Thereafter, the assigning unit 13 reassigns the data addressed to the cell phone 50 subjected to the handover process, based on the handover process. This is carried out in such a manner that the assigning unit 13 recalculates the assignment rates for the cell phone 50. Furthermore, the transmitting unit 15 updates the destination information (step S24).

Figure 8:
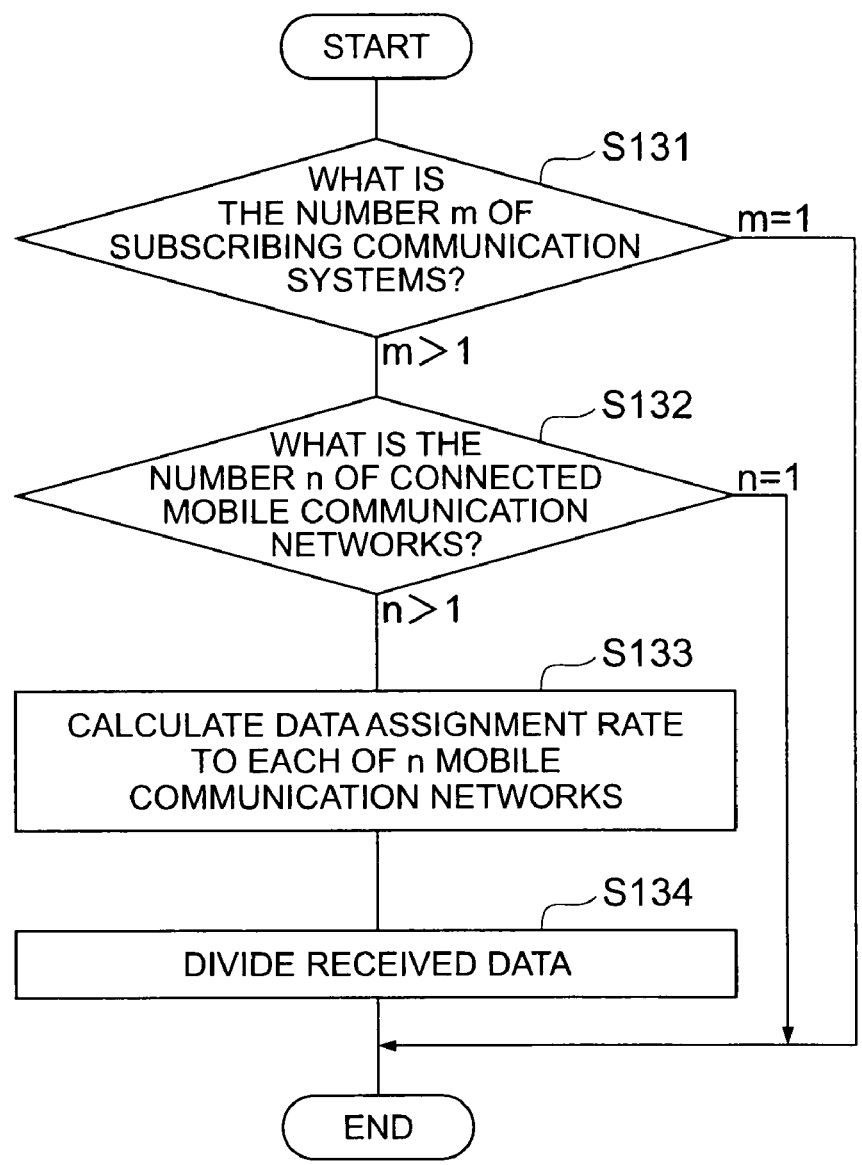
FIG. 8 is a flowchart showing a data assigning process shown in FIG. 6.

FIG. 8 is a flowchart showing the data assigning process (assigning step) shown in FIG. 6. In the assigning unit 13, the assignment judging unit 131 first judges whether it is necessary to divide the data, based on the subscription information of the destination cell phone 50 (step S131). In a case where the cell phone 50 subscribes to a plurality of communication systems (step S131; m>1), the connection status judging unit 132 judges whether it is necessary to divide the data, based on the number of mobile communication networks to which the cell phone 50 is connected (step S132). At this time, when the cell phone 50 is connected to a plurality of mobile communication networks (step S132; n>1), the data assigning unit 133 calculates the data assignment rates (step S133) and divides the data addressed to the cell phone 50, in accordance with the calculated assignment rates (step S134). In contrast to the above, where the cell phone 50 subscribes to only one communication system (step S131; m=1), or where the cell phone 50 is connected to only one mobile communication network (step S132; n=1), the assigning unit 13 outputs the data to the transmitting unit 15, without dividing the data.

Examples of the assignment (including reassignment) of data by the assigning unit 13 will be described below using FIGS. 9 to 12. FIGS. 9 to 12 are drawings showing respective patterns of data assignment by the assigning unit 13.

Figure 9:
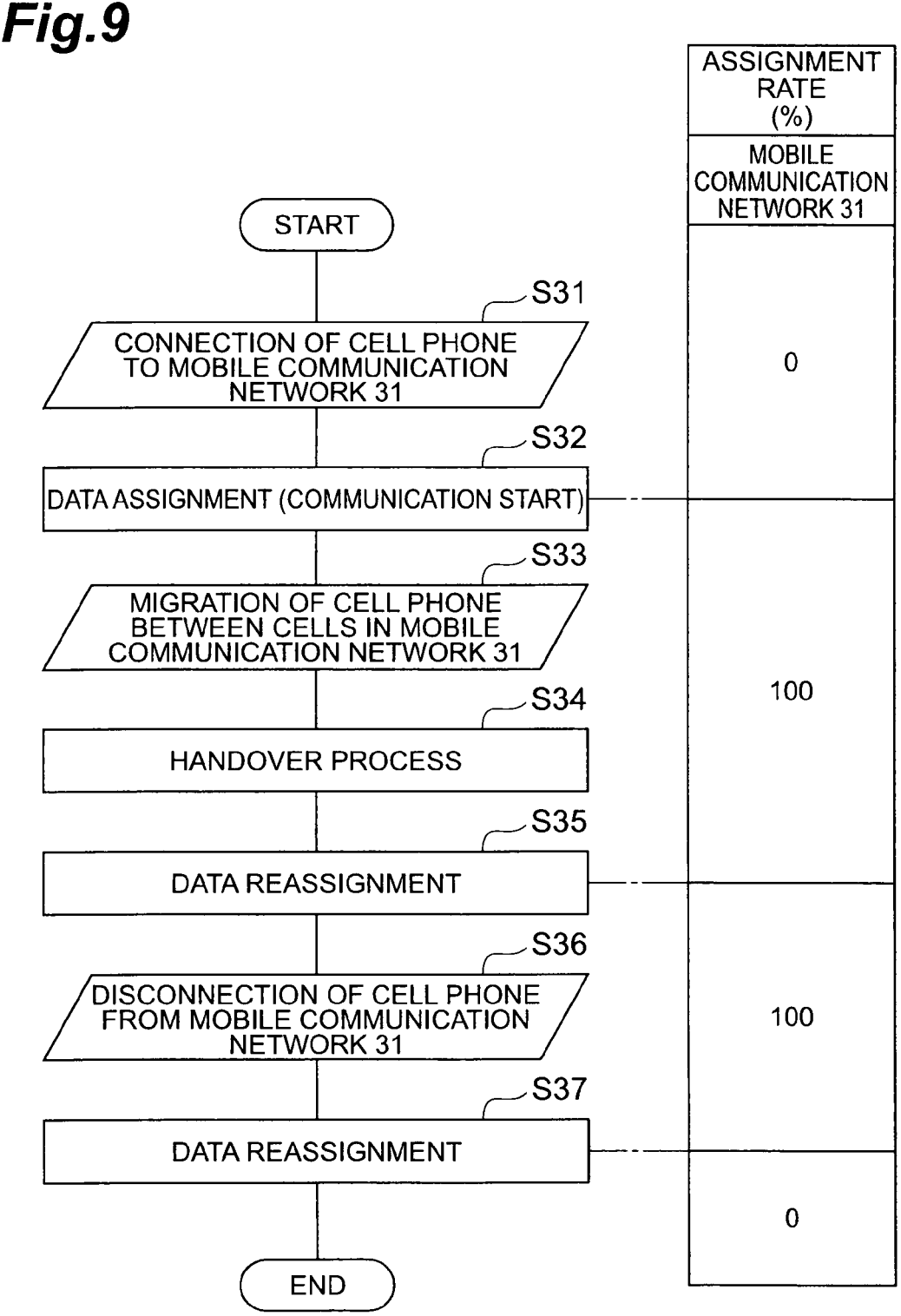
FIG. 9 is a drawing showing a pattern of data assignment by the assigning unit shown in FIG. 1.

An example shown in FIG. 9 indicates an operation in a case where the cell phone 50 becomes connected to the mobile communication network 31, for example, by power activation, the cell phone 50 migrates between cells in the mobile communication network 31, and the cell phone 50 finally becomes disconnected from the mobile communication network 31, for example, by power deactivation (step S36).

In this case, before the cell phone 50 is connected to the mobile communication network 31, the assignment rate of the cell phone 50 to the mobile communication network 31 is 0 (%) (or the assignment rate is not registered yet). Thereafter, the cell phone 50 becomes connected to the mobile communication network 31 (step S31), and then the assigning unit 13 performs the assignment of data (or reassignment) (step S32) to update the assignment rate to 100 (%) (or register the new assignment rate). Thereafter, the cell phone 50 migrates between cells in the mobile communication network 31 (step S33), the handover processing unit 14 then performs the handover process (step S34), and the assigning unit 13 recalculates the assignment rate, based on the handover process (step S35). Then the cell phone 50 becomes disconnected from the mobile communication network 31 (step S36), and the assignment rate is recalculated (step S37).

Since the handover process shown in FIG. 9 occurs within the mobile communication network 31, there is no change in the assignment rate determined for each mobile communication network or for each communication system. Therefore, the assigning unit 13 may also be configured so as not to perform the reassignment of data in the case where the handover occurs in a certain mobile communication network only. This reduces the load of the reassignment of data.

In the example shown in FIG. 9, the handover processing unit 14 performs the handover process upon migration of the cell phone 50 between cells, but there is a case where the handover process is completed in the mobile communication network and the handover processing unit 14 performs nothing. For example, it is a case where the migration of cell phone 50 between cells changes only a downstream path in a communication route in the mobile communication network but does not change the direct destination from the communication control apparatus 10.

Figure 10:
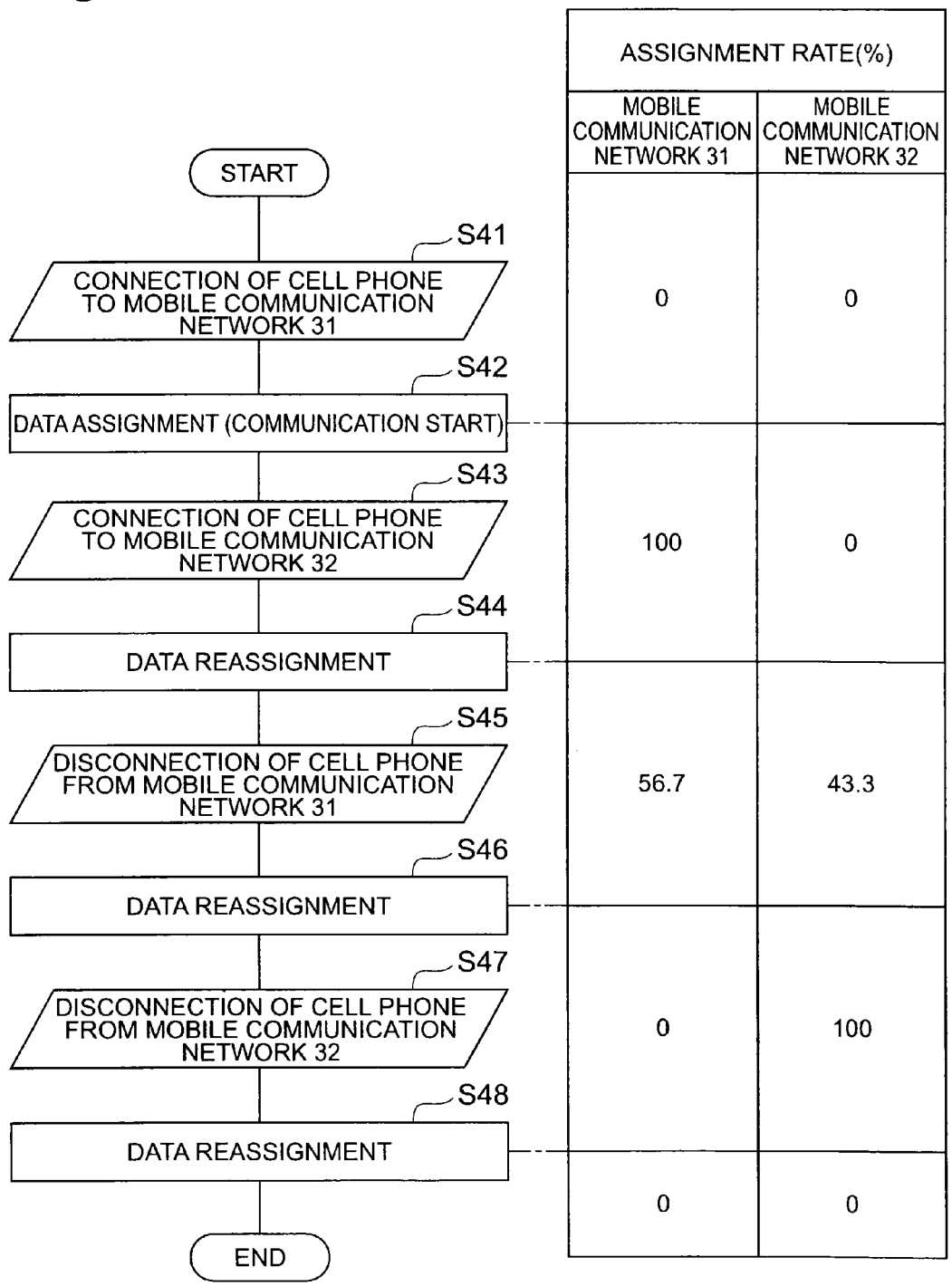
FIG. 10 is a drawing showing a pattern of data assignment by the assigning unit shown in FIG. 1.

An example shown in FIG. 10 indicates an operation in a case where after the cell phone 50 is connected to the mobile communication network 31, it also becomes further connected to the mobile communication network 32 and thereafter disconnected in the order of the mobile communication networks 31 and 32. The processes of steps S41 and S42 in FIG. 10 are the same as the respective processes of steps S31 and S32 in FIG. 9. Thereafter, the cell phone 50 also becomes further connected to the mobile communication network 32 (step S43), and then the assigning unit 13 performs the reassignment of data to update the assignment rates to the mobile communication networks 31 and 32 (step S44). Thereafter, the cell phone 50 becomes disconnected from the mobile communication network 31 (step S45), and then the assigning unit 13 performs the reassignment to update the assignment rates so as to transmit the data addressed to the cell phone 50, to the mobile communication network 32 only (step S46). The processes of steps S47 and S48 are the same as the respective processes of steps S36 and S37 in FIG. 9.

In FIG. 10, the timings of connections to the mobile communication networks 31 and 32 and disconnections from those mobile communication networks are different between the communication networks, but there is a case where the cell phone 50 becomes simultaneously (or almost simultaneously) connected to or disconnected from a plurality of mobile communication networks. In this case, the assigning unit 13 determines the assignment rates by a single data reassignment process, with simultaneously occurring connections or disconnections. For example, where the processes of steps S41 and S43 in FIG. 10 occur simultaneously, the assigning unit 13 performs only the process of step S44. As a result, the assignment rate to the mobile communication network 31 is updated from 0 (%) to 56.7 (%) and the assignment rate to the mobile communication network 32 is updated from 0 (%) to 43.3 (%).

Figure 11:
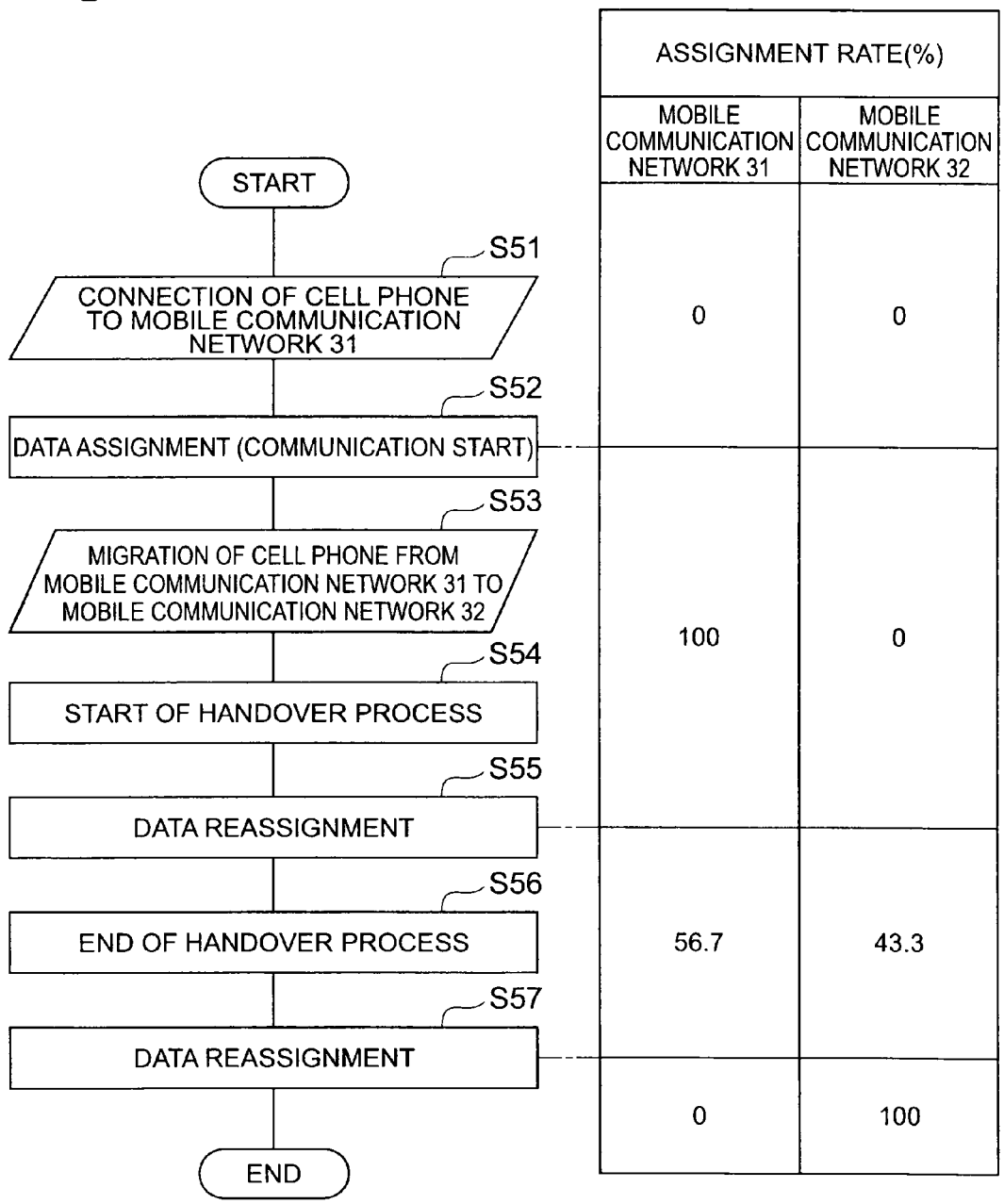
FIG. 11 is a drawing showing a pattern of data assignment by the assigning unit shown in FIG. 1.

An example shown in FIG. 11 indicates an operation in a case where the cell phone 50 migrates from an area of the mobile communication network 31 to an area of the mobile communication network 32. The processes of steps S51 and S52 are the same as the respective processes of steps S31 and S32 in FIG. 9. Thereafter, the cell phone 50 migrates from the area of mobile communication network 31 to the area of mobile communication network 32 (step S53), and then the handover processing unit 14 initiates the handover process (step S54). Then the assigning unit 13 performs the reassignment of data (step S55).

During execution of the handover process, the cell phone 50 is able to communicate with both of the mobile communication networks 31 and 32 temporarily. For this reason, the data assignment process (step S55) immediately after the initiation of the handover process results in updating the assignment rates so as to implement assignment of data to both of the mobile communication networks 31 and 32. Thereafter, the handover process to the mobile communication network 32 is finished (step S56), and then the data assignment process is executed again (step S57) to update the assignment rates so as to transmit the data to the mobile communication network 32 only.

Figure 12:
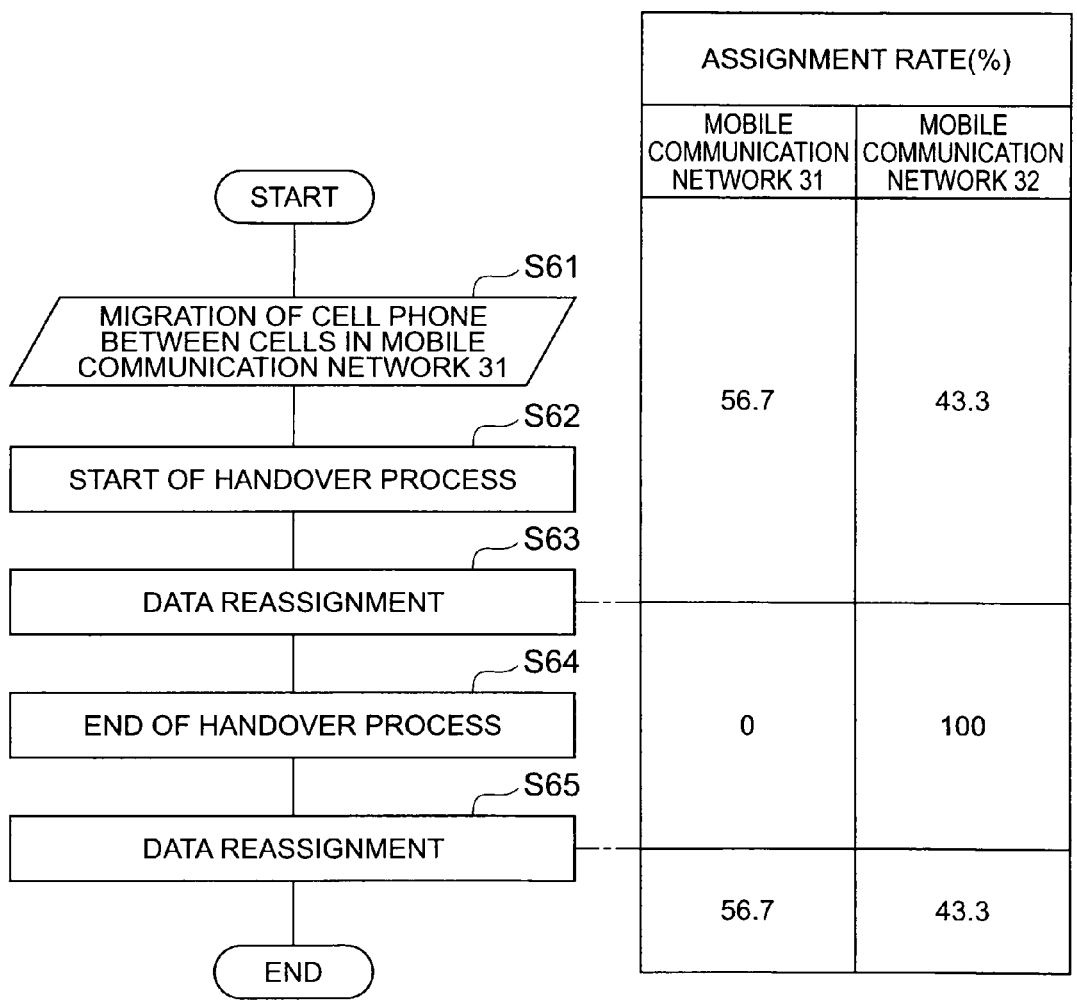
FIG. 12 is a drawing showing a pattern of data assignment by the assigning unit shown in FIG. 1.

An example shown in FIG. 12 indicates an operation in a case where the cell phone 50 connected to both of the mobile communication networks 31 and 32 migrates between cells in the mobile communication network 31. When the cell phone 50 migrates between cells in the mobile communication network 31 (step S61), the handover processing unit 14 initiates the handover process (step S62). Then the assigning unit 13 performs the reassignment of data (step S63). This reassignment results in assigning data to the mobile communication network except for the mobile communication network 31 subjected to the handover process, i.e., to the mobile communication network 32 only. For this reason, the assignment rates of the mobile communication networks 31 and 32 are updated to 0 (%) and 100 (%), respectively. Thereafter, the handover process by the handover processing unit 14 is finished (step S64), and the reassignment of data is carried out again (step S65) to update the assignment rates of the mobile communication networks 31 and 32 to the values before the initiation of the handover.

Without being limited to the examples of FIGS. 9 to 12, the communication control apparatus 10 is able to assign data in various connection statuses of the cell phone 50. For example, the communication control apparatus 10 is able to assign data by applying the processes shown in FIGS. 9 to 12, to cases where the number of mobile communication networks increases and where the mode of handover is different.

Figure 15:
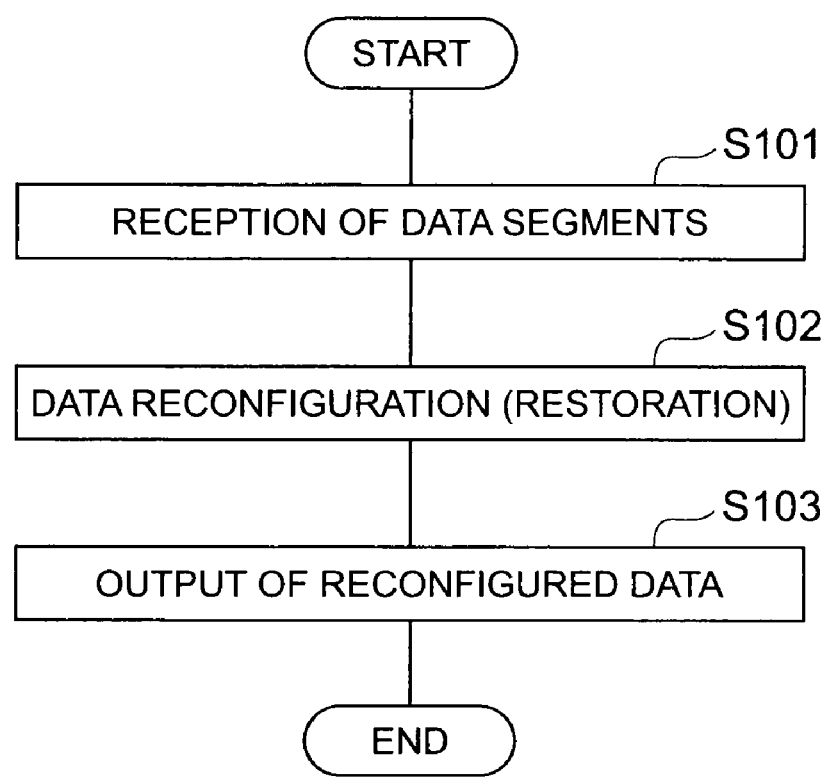
FIG. 15 is a flowchart showing a processing procedure of the cell phone shown in FIG. 1.

The processing of the cell phone 50 shown in FIG. 1 will be described below along with a data reception method according to the present embodiment, using FIG. 15.

The cell phone 50 first receives the data segments transmitted from each mobile communication network to which it is connected (step S101, receiving step) and reconfigures these data segments to restore the data (step S102, reconfiguring step). Then the reconfigured data is outputted (step S103).

In the present embodiment, as described above, the connection status of the cell phone 50 in each mobile communication network is detected, and, based on the volume of the data (data size) addressed to the cell phone 50 and the connection status thus detected, the data is assigned to each mobile communication network (e.g., the mobile communication networks 31 and 32) to which the cell phone 50 is connected, and transmitted to the each mobile communication network. The handover process is carried out based on the connection status of the cell phone 50. In this configuration, the assignment of data to each mobile communication network and the handover process are carried out according to the connection status of the cell phone 50. For this reason, the data can be transmitted to the cell phone 50 through a plurality of types of mobile communication networks while the handover of the cell phone 50 is handled.

When data is transmitted through a plurality of types of mobile communication networks with the handover being handled in this manner, it becomes feasible to increase the overall transmission rate of data and to transmit the data more reliably, without occurrence of transmission interruption. Namely, the present embodiment can optimize the data transmission to the mobile communication terminal.

Since the present embodiment is adapted to perform the reassignment of data not only at the time of end of the handover process, but also at the time of start of the handover process, it thus becomes feasible to perform fine reassignment of data. Since at this time the data is assigned to the mobile communication network except for the mobile communication network subjected to the handover, the data can be transmitted to only the mobile communication network capable of data communication. For this reason, the efficiency of data transmission becomes more improved.

In the present embodiment, based on the communication rate of each mobile communication network to which the cell phone 50 is connected, the data is assigned to the each mobile communication network. Since the communication rate of the mobile communication network affects the transmission efficiency of data, the data can be transmitted more efficiently to the cell phone 50 by performing the assignment of data with consideration to the communication rate.

In the present embodiment, the cell phone 50 receives the data assigned to each mobile communication network by the communication control apparatus 10, and reconfigures the data addressed to the cell phone 50, from the received data. This results in reconfiguring the data assigned to each mobile communication network, to restore the original data in the cell phone 50, whereby the user of the cell phone 50 is allowed to use the desired data.

The above detailed the present invention on the basis of the embodiments thereof. It should be, however, noted that the present invention is by no means intended to be limited to the above embodiments. The present invention can be modified in various ways as described below, without departing from the scope of the invention.

The foregoing embodiment was adapted so that the assigning unit 13 performed the reassignment of data at every time of a start and an end of the handover process by the handover processing unit 14, but the timing of reassignment of data is not limited to this example. For example, the assigning unit 13 may also be configured to perform the reassignment process only at the time of the end of the handover process by the handover processing unit 14. In this case, the reassignment of data is carried out when the handover process is finished, i.e., when a connection environment of the cell phone 50 after the handover is settled. This reduces the number of reassignment processes with the handover, and thus reduces the load of reassignment processes on the communication control apparatus 10.

When the assigning unit 13 is constructed as in this modification example, the transitions of assignment rates shown in FIGS. 11 and 12 are modified as described below. Namely, in the example of FIG. 11, the reassignment process of step S55 is not carried out, and the reassignment process of step S57 results in updating the assignment rate to the mobile communication network 31 from 100 (%) to 0 (%) and updating the assignment rate to the mobile communication network 32 from 0 (%) to 100 (%). In the example of FIG. 12, the reassignment process of step S63 is not carried out, and the assignment rates to the mobile communication networks 31 and 32 remain unchanged as a result.

The above embodiment adopted the data assignment method of calculating the assignment rates of data according to Eq (1) above based on the communication rates of the respective mobile communication networks and assigning the data according to the assignment rates, but the data assignment method is not limited to this example. For example, the data assigning unit 133 may be configured to preliminarily determine assignment rates for each combination of mobile communication networks as assignment targets and to assign the data according to the assignment rates. For example, the assignment rates may be preliminarily determined as follows: for "HSDPA, WLAN" as mobile communication networks of assignment targets, "HSDPA=40%, WLAN=60%"; for "CDMA, HSDPA, WLAN," "CDMA=40%, HSDPA=20%, WLAN=40%." The data assigning unit 133 may be configured to calculate the assignment rates according to another equation different from the aforementioned Eq (1), with consideration to specifications of the respective communication systems except for the communication rates.

In the above embodiment the assigning unit determined whether it is necessary to perform the data assignment (data division), based on the subscription information and connection status of the cell phone 50, but the method of determining whether it is necessary to perform the data assignment is not limited to this example. For example, whether it is necessary to perform the data assignment may also be determined based on the volume (data size) of data to be transmitted to the cell phone 50 and a difference of communication rates between a plurality of mobile communication networks to which the cell phone 50 is connected.

For example, where the data size is not more than a predetermined value (e.g., 10 kilobytes or the like), the assigning unit 13 may be configured to determine that no data assignment is necessary, and to output the data addressed to the cell phone 50, to the transmitting unit 15, without execution of the data assignment (data division). This reduces the number of data assignment processes and thus reduces the load of data assignment processes on the communication control apparatus 10. Furthermore, the cell phone 50 can use the transmitted data as it is, and thus the load is also reduced on the cell phone 50.

In a case where the difference of communication rates between a plurality of mobile communication networks is very large, the data division can lead to reduction in the efficiency of data transmission. For example, in a case where the cell phone 50 is connected to a mobile communication network of the TDMA system (whose communication rate is 9.6 kbps) and to a mobile communication network of the HSDPA system (whose communication rate is 14.4 Mbps), the assignment rates to them based on the above embodiment are "HSDPA=99.93 (%), TDMA=0.07 (%)." For this reason, there is no big change from the case where the data is transmitted using only the mobile communication network of the HSDPA system, and the data transmission could be slower by the degree of assignment of data. For this reason, the assigning unit 13 may be configured to determine that no data assignment is necessary, when the difference of assignment rates between a plurality of mobile communication networks is not less than a predetermined threshold (e.g., 50% or more) or when one of the assignment rates between a plurality of mobile communication networks is not less than a predetermined threshold (e.g., 90% or the like).

The above embodiment used the cell phone 50 as a mobile communication terminal, but it is also possible to use another communication terminal adapted to perform the handover process.

In the above embodiment the communication control apparatus 10 assigned the data to each communication network and transmitted the data to the cell phone 50 and the cell phone 50 reconfigured the data, but the present invention may also be applied to a process of transmitting data from the cell phone 50 to another communication apparatus such as the communication control apparatus 10. Namely, the system may be configured so that the cell phone 50 assigns the data to each communication network and the other communication apparatus reconfigures the data. In this case, the cell phone 50 is provided with elements similar to the aforementioned detecting unit 12, assigning unit 13, handover processing unit 14, and transmitting unit 15, and the other communication apparatus is provided with functions similar to the aforementioned receiving unit 51 and reconfiguring unit 52. In this configuration, when data is transmitted from the cell phone 50 to the other communication apparatus, the data can also be transmitted to the other communication apparatus through a plurality of types of mobile communication networks while the handover of cell phone 50 is handled. As a consequence, it becomes feasible to increase the transmission rate of data as a whole and to transmit the data more reliably, without occurrence of transmission interruption.

What is claimed is:

1. A communication control apparatus for controlling data communication to a mobile communication terminal connectable to a plurality of types of communication networks, comprising:
   a detecting unit that detects a connection status of the mobile communication terminal in each communication network;
   an assigning unit that assigns data addressed to the mobile communication terminal, to each communication network to which the mobile communication terminal is connected, based on a volume of the data addressed to the mobile communication terminal and the connection status detected by the detecting unit;
   a transmitting unit that transmits the data assigned to each communication network by the assigning unit, to said each communication network; and
   a handover processing unit that performs a handover process in the plurality of types of communication networks, based on the connection status detected by the detecting unit,
   wherein when the detecting unit detects that the mobile communication terminal is simultaneously connected to a plurality of communication networks, the assigning unit divides data addressed to the mobile communication terminal into separate portions and assigns each of the separate portions to a separate one of the connected communication networks based on the volume of data and the communication rates of the connected communication networks.

2. A communication control apparatus for controlling data communication to a mobile communication terminal connectable to a plurality of types of communication networks, comprising:
   a detecting unit that detects a connection status of the mobile communication terminal in each communication network;
   an assigning unit that assigns data addressed to the mobile communication terminal, to each communication network to which the mobile communication terminal is connected, based on a volume of the data addressed to the mobile communication terminal and the connection status detected by the detecting unit;
   a transmitting unit that transmits the data assigned to each communication network by the assigning unit, to said each communication network; and
   a handover processing unit that performs a handover process in the plurality of types of communication networks, based on the connection status detected by the detecting unit,
   wherein when the handover process by the handover processing unit is finished, the assigning unit reassigns the data addressed to the mobile communication terminal.

3. The communication control apparatus according to claim 2, wherein when the handover process by the handover processing unit is initiated, the assigning unit reassigns the data addressed to the mobile communication terminal.

4. The communication control apparatus according to claim 3, wherein when the handover processing unit initiates the handover process for one communication network out of communication networks to which the mobile communication terminal is connected, the assigning unit reassigns the data addressed to the mobile communication terminal, to each communication network except for said one communication network.

5. A communication control apparatus for controlling data communication to a mobile communication terminal connectable to a plurality of types of communication networks, comprising:
   a detecting unit that detects a connection status of the mobile communication terminal in each communication network;
   an assigning unit that assigns data addressed to the mobile communication terminal, to each communication network to which the mobile communication terminal is connected, based on a volume of the data addressed to the mobile communication terminal and the connection status detected by the detecting unit;

a transmitting unit that transmits the data assigned to each communication network by the assigning unit, to said each communication network; and a handover processing unit that performs a handover process in the plurality of types of communication networks, based on the connection status detected by the detecting unit, wherein the assigning unit assigns the data addressed to the mobile communication terminal, to each communication network, based on a communication rate of said each communication network.

6. A communication control method for a communication control apparatus to control data communication to a mobile communication terminal connectable to a plurality of types of communication networks, comprising:

a detecting step wherein the communication control apparatus detects a connection status of the mobile communication terminal in each communication network;

an assigning step wherein the communication control apparatus assigns data addressed to the mobile communication terminal, to each communication network to which the mobile communication terminal is connected, based on a volume of the data addressed to the mobile communication terminal and the connection status detected in the detecting step;

a transmitting step wherein the communication control apparatus transmits the data assigned to each communication network in the assigning step, to said each communication network; and a handover processing step wherein the communication control apparatus performs a handover process in the plurality of types of communication networks, based on the connection status detected in the detecting step, wherein when the communication control apparatus detects that the mobile communication terminal is simultaneously connected to a plurality of communication networks in the detecting step, the communication control apparatus divides data addressed to the mobile communication terminal into separate portions and assigns each of the separate portions to a separate one of the connected communication networks based on the volume of data and the communication rates of the connected communication networks.

7. A mobile communication terminal configured to perform data communication with a communication control apparatus, through connection to a plurality of types of communication networks, comprising:

receiving unit for receiving data, which was transmitted by the communication control apparatus after the communication control apparatus assigned data addressed to the mobile communication terminal, to each communication network, from said each communication network; and reconfiguring unit for reconfiguring the data received by the receiving unit, to restore the data addressed to the mobile communication terminal, wherein the communication control apparatus includes a detecting unit that detects a connection status of the mobile communication terminal in each communication network;

an assigning unit that assigns data addressed to the mobile communication terminal, to each communication network to which the mobile communication terminal is connected, based on a volume of the data addressed to the mobile communication terminal and the connection status detected by the detecting unit;

a transmitting unit that transmits the data assigned to each communication network by the assigning unit, to said each communication network; and a handover processing unit that performs a handover process in the plurality of types of communication networks, based on the connection status detected by the detecting unit.

8. A data reception method for a mobile communication terminal configured to receive data from a communication control apparatus, through connection to a plurality of types of communication networks, comprising:

a receiving step wherein the mobile communication terminal receives data, which was transmitted by the communication control apparatus after the communication control apparatus assigned data addressed to the mobile communication terminal, to each communication network, from said each communication network; and a reconfiguring step wherein the mobile communication terminal reconfigures the data received in the receiving step, to restore the data addressed to the mobile communication terminal, wherein the communication control apparatus includes a detecting unit that detects a connection status of the mobile communication terminal in each communication network;

an assigning unit that assigns data addressed to the mobile communication terminal, to each communication network to which the mobile communication terminal is connected, based on a volume of the data addressed to the mobile communication terminal and the connection status detected by the detecting unit;

a transmitting unit that transmits the data assigned to each communication network by the assigning unit, to said each communication network; and a handover processing unit that performs a handover process in the plurality of types of communication networks, based on the connection status detected by the detecting unit.

* * * * *